Feb. 25, 1930. H. O. LANGE Re. 17,607

PILLOW AND CUSHION AND CASING FOR SAME

Original Filed Feb. 24, 1928

Inventor

Hans Ove Lange

By Spear Middleton Donaldson & Hall

Attorneys

Reissued Feb. 25, 1930

Re. 17,607

UNITED STATES PATENT OFFICE

HANS OVE LANGE, OF COPENHAGEN, DENMARK

PILLOW AND CUSHION AND CASING FOR SAME

Original No. 1,703,629, dated February 26, 1929, Serial No. 256,758, filed February 24, 1928, and in Denmark December 24, 1927. Application for reissue filed December 6, 1929. Serial No. 412,272.

The invention refers to a pillow, sofa-cushion and the like, and a casing for same.

The invention consists in the pillow's casing having superposed pockets decreasing in size upwards and/or downwards from a main pocket.

The attached drawing shows:—

Figure 1:
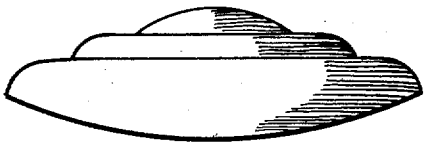
Figure 2:
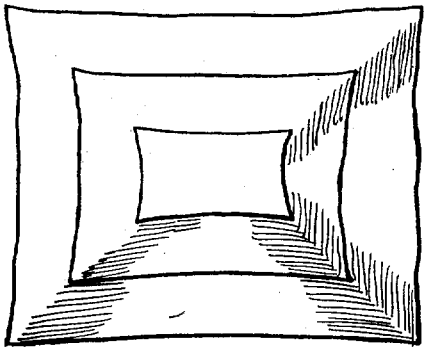
Figure 3:
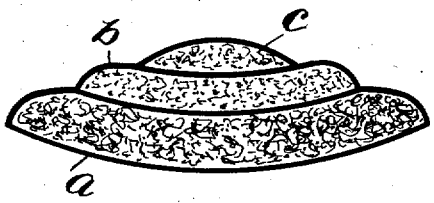

Figure 1 a side view of a pillow as per invention;

Figure 2 the same as seen from above;

Figure 3 a cross section of same; and

Figure 4:
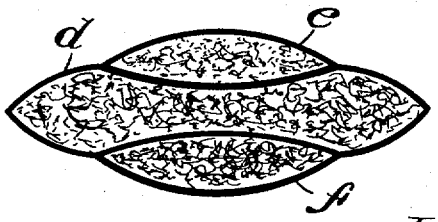

Figure 4 a cross section of a different style of execution as per invention.

In the pillow as per Figures 1–3, the filling material is put into three superposed pockets *a*, *b* and *c*, decreasing in size in the direction from the pillow's back towards its front. The pillow shown by Figure 4 has likewise three pockets, *d*, *e* and *f*, but in this case the middle pocket *d* is the biggest, while the pockets at the top and bottom, respectively *e* and *f*, are smaller.

The pockets of the pillow can be filled either with the same or with different materials. For pillows it would in general be preferable to put into the largest pocket a strong elastic filling material of good carrying capacity, e. g. bed feathers, curled hair or kapok, in the next pocket a light half down, and in the third and smallest pocket, if any, a down.

As shown by the drawing, the pillow is made with two or more superposed pockets, decreasing in size from a main pocket which can be situated either at the bottom or in the centre of the pillow, or in general can be any of the pockets in the pillow. It will be clearly seen from the drawings that this decrease in size is in a lateral direction so that the superposed or supplemental pocket is of less lateral area than the main pocket to which it is attached, and, as the supplemental pocket (or pockets) is (or are) located approximately centrally of the main or underlying pocket this provides a marginal portion of the main or underlying pocket which projects beyond the margin of the supplemental or superposed pocket, as shown in all the figures and especially in Figure 2.

When the pockets are filled with stuffing or distending material it will be observed from Figures 1, 3 and 4 that their edges are curved on arcs of circles which merge into each other so that the surface of the pillow as a whole is of approximately uniform convex curvature.

The walls between these pockets can be single or double and the pieces of cloth are sewn or in some other way fastened to each other. The pockets serve for receiving the filling material.

The pillow as per invention distinguishes itself by keeping the filling material in place, and because it can be filled with different kinds of such materials according to the various purposes for which it is to be used, advantages not attained by the kind of pillows known up to now.

In pillows consisting of one pocket only, the filling material during use is forced towards the edges, with the result that the centre of the pillow offers but deficient support. This is obviated by the invention, inasmuch as the shifting of the filling material is restricted within each separate pocket. When an ordinary pocket, in order to give a specially soft support, is stuffed with a fine material, for instance down, it is apt to double up under the weight of the head, a drawback which especially in summer time or in warm climates can produce insomnia and on the whole is unhealthful. In the pillow as per invention, these drawbacks are overcome, as the smallest pocket only is meant to be filled with down and the remaining pockets with less heat insulating materials possessing greater carrying capacity. For this reason the pillow as per invention is particularly suitable for use in hospitals, and the danger of placing babies on soft down pillows folding up around the head, is obviated.

A pillow executed as shown by Figure 4 possesses moreover the advantage that one side can be stuffed for winter use and the other one for summer use, by filling pocket "*e*" with a heat-insulating material, for instance with down as being most suitable for use in winter, whereas pocket "*f*" when filled with a less heat-insulating material as for instance the soft part of feather vanes, gives a soft but cooler support for the head in summer time, which particularly is of advantage in countries with considerable variations of temperature.

In spite of the above mentioned important properties, the pillow can be produced at a lower price than the ordinary kind of pillows used up to now, as for the largest pocket a coarser and cheaper quality of feathers can be employed which moreover has the advantage of being stronger and possessing greater resiliency and carrying capacity. Of the dearer qualities of half down and down intended for the smaller pockets, a minor quantity only is required in comparison to the total weight of the filling material. The casing or covering likewise can be made cheaper, a down proof fabric being required only for the comparatively small portion of the pillow which is to contain down, while a casing for the coarser filling material which forms the greater portion of the pillow, a considerably cheaper fabric can be employed.

The invention is not restricted to the styles of execution shown and described above, as they can be altered in different ways, especially as regards number, size and shape of the pockets, without exceeding the scope of the invention.

Having thus fully described my invention, I claim as new and desire to secure by Letters Patent:

1. A pillow of the kind adapted to be used as a bedding pillow, sofa cushion or the like, consisting of a casing and filling material, said casing composed of a main pocket and a series of superposed pockets sewed on top of said main pocket, said superposed pockets decreasing in size from the main pocket.

2. A pillow or cushion of the class described, consisting of a main casing filled with coarse material, a series of superposed pockets of decreasing size sewed on the top of the main pockets, said pockets of decreasing size filled with fine soft material.

3. A pillow or sofa cushion provided with means forming a pocket having a concaved upper surface and outer convex margins projecting beyond said surface, covering material having its margins secured inwardly from the periphery of the means aforesaid to form a supplemental pocket, and filling material in both said pockets, the exposed portions of said pillow having a substantially continuously curved contour.

HANS OVE LANGE.